United States Patent
Stefik et al.

(10) Patent No.: US 8,356,044 B2
(45) Date of Patent: *Jan. 15, 2013

(54) SYSTEM AND METHOD FOR PROVIDING DEFAULT HIERARCHICAL TRAINING FOR SOCIAL INDEXING

(75) Inventors: Mark J. Stefik, Portola Valley, CA (US); Sanjay Mittal, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 532 days.

This patent is subject to a terminal disclaimer.

(21) Appl. No.: 12/360,825

(22) Filed: Jan. 27, 2009

(65) Prior Publication Data

US 2010/0191773 A1    Jul. 29, 2010

(51) Int. Cl.
*G06F 17/30* (2006.01)

(52) U.S. Cl. ........................................ 707/758; 707/781

(58) Field of Classification Search .................. None
See application file for complete search history.

(56) References Cited

U.S. PATENT DOCUMENTS

| | | | |
|---|---|---|---|
| 5,257,939 A * | 11/1993 | Robinson et al. | 434/129 |
| 5,369,763 A * | 11/1994 | Biles | 1/1 |
| 5,530,852 A | 6/1996 | Meske et al. | |
| 5,659,766 A * | 8/1997 | Saund et al. | 704/9 |
| 5,671,342 A | 9/1997 | Millier et al. | |
| 5,680,511 A * | 10/1997 | Baker et al. | 704/257 |
| 5,724,567 A | 3/1998 | Rose et al. | |
| 5,784,608 A | 7/1998 | Meske et al. | |
| 5,907,677 A | 5/1999 | Glenn et al. | |
| 5,907,836 A | 5/1999 | Sumita et al. | |
| 5,953,732 A | 9/1999 | Meske et al. | |
| 6,021,403 A * | 2/2000 | Horvitz et al. | 706/45 |
| 6,052,657 A * | 4/2000 | Yamron et al. | 704/9 |
| 6,064,952 A | 5/2000 | Imanaka et al. | |
| 6,233,570 B1 | 5/2001 | Horvitz et al. | |
| 6,233,575 B1 * | 5/2001 | Agrawal et al. | 1/1 |
| 6,240,378 B1 | 5/2001 | Imanaka et al. | |
| 6,247,002 B1 * | 6/2001 | Steels | 706/20 |
| 6,269,361 B1 | 7/2001 | Davis et al. | |
| 6,285,987 B1 | 9/2001 | Roth et al. | |
| 6,292,830 B1 * | 9/2001 | Taylor et al. | 709/224 |

(Continued)

FOREIGN PATENT DOCUMENTS

EP     1571579     9/2005

(Continued)

OTHER PUBLICATIONS

C. Holahan, "So Many Ads, So Few Clicks," BusinessWeek, p. 38 (Nov. 12, 2007).

(Continued)

*Primary Examiner* — Farhan Syed
(74) *Attorney, Agent, or Firm* — Patrick J. S. Inouye

(57) ABSTRACT

A system and method for providing default hierarchical training for social indexing is provided. Articles of digital information for social indexing are maintained. A hierarchically-structured tree of topics is specified. Each topic includes a label that includes one or more words. Constraints inherent in the literal structure of the topic tree are identified. For each topic in the topic tree, a topic model that includes at least one term derived from the words in at least one of the labels is created. The topic models for the topic tree are evaluated against the constraints. Those of the topic models, which best satisfy the constraints are identified.

20 Claims, 14 Drawing Sheets

U.S. PATENT DOCUMENTS

| | | | |
|---|---|---|---|
| 6,397,211 | B1 | 5/2002 | Cooper |
| 6,598,045 | B2 | 7/2003 | Light et al. |
| 6,772,120 | B1 * | 8/2004 | Moreno et al. ............... 704/256 |
| 6,804,688 | B2 | 10/2004 | Kobayashi et al. |
| 6,981,040 | B1 | 12/2005 | Konig et al. |
| 7,062,485 | B1 * | 6/2006 | Jin et al. ............................ 1/1 |
| 7,092,888 | B1 * | 8/2006 | McCarthy et al. ........... 704/277 |
| 7,200,606 | B2 | 4/2007 | Elkan |
| 7,275,061 | B1 | 9/2007 | Kon et al. |
| 7,281,022 | B2 | 10/2007 | Gruhl et al. |
| 7,293,019 | B2 | 11/2007 | Dumais et al. |
| 7,320,000 | B2 | 1/2008 | Chitrapura et al. |
| 7,426,557 | B2 | 9/2008 | Gruhl et al. |
| 7,467,202 | B2 | 12/2008 | Savchuk |
| 7,496,567 | B1 | 2/2009 | Steichen |
| 7,548,917 | B2 | 6/2009 | Nelson |
| 7,567,959 | B2 | 7/2009 | Patterson |
| 7,600,017 | B2 * | 10/2009 | Holtzman et al. ............ 709/224 |
| 7,685,224 | B2 | 3/2010 | Nye |
| 7,707,206 | B2 | 4/2010 | Encina et al. |
| 7,747,593 | B2 | 6/2010 | Patterson et al. |
| 7,809,723 | B2 | 10/2010 | Liu et al. |
| 7,890,485 | B2 | 2/2011 | Malandain et al. |
| 7,890,502 | B2 * | 2/2011 | Liu et al. ...................... 707/726 |
| 2002/0161838 | A1 | 10/2002 | Pickover et al. |
| 2004/0059708 | A1 | 3/2004 | Dean et al. |
| 2005/0097436 | A1 * | 5/2005 | Kawatani ..................... 715/500 |
| 2005/0226511 | A1 | 10/2005 | Short |
| 2005/0278293 | A1 | 12/2005 | Imaichi et al. |
| 2006/0167930 | A1 | 7/2006 | Witwer et al. |
| 2007/0050356 | A1 * | 3/2007 | Amadio ............................ 707/5 |
| 2007/0112815 | A1 * | 5/2007 | Liu et al. ...................... 707/101 |
| 2007/0156622 | A1 | 7/2007 | Akkiraju et al. |
| 2007/0214097 | A1 * | 9/2007 | Parsons et al. .................. 706/12 |
| 2007/0239530 | A1 | 10/2007 | Datar et al. |
| 2007/0244690 | A1 * | 10/2007 | Peters .............................. 704/8 |
| 2007/0260508 | A1 | 11/2007 | Barry et al. |
| 2007/0260564 | A1 * | 11/2007 | Peters et al. .................... 706/14 |
| 2007/0271086 | A1 * | 11/2007 | Peters et al. ...................... 704/9 |
| 2008/0040221 | A1 | 2/2008 | Wiseman et al. |
| 2008/0065600 | A1 | 3/2008 | Batteram et al. |
| 2008/0126319 | A1 | 5/2008 | Bukai et al. |
| 2008/0133482 | A1 | 6/2008 | Anick et al. |
| 2008/0140616 | A1 * | 6/2008 | Encina et al. ..................... 707/3 |
| 2008/0201130 | A1 * | 8/2008 | Peters et al. ...................... 704/9 |
| 2008/0307326 | A1 | 12/2008 | Gruhl et al. |
| 2009/0099839 | A1 * | 4/2009 | Stefik ............................... 704/9 |
| 2009/0099996 | A1 * | 4/2009 | Stefik ............................. 706/54 |
| 2010/0042589 | A1 * | 2/2010 | Smyros et al. .................... 707/3 |
| 2010/0057577 | A1 * | 3/2010 | Stefik et al. ............... 705/14.73 |
| 2010/0058195 | A1 * | 3/2010 | Stefik et al. ................... 715/744 |
| 2010/0070485 | A1 | 3/2010 | Parsons et al. |
| 2010/0083131 | A1 | 4/2010 | You |
| 2010/0114561 | A1 * | 5/2010 | Yasin ............................... 704/9 |
| 2010/0125540 | A1 * | 5/2010 | Stefik et al. .................... 706/12 |
| 2010/0191741 | A1 * | 7/2010 | Stefik et al. ................... 707/748 |
| 2010/0191742 | A1 * | 7/2010 | Stefik et al. ................... 707/748 |
| 2010/0191773 | A1 * | 7/2010 | Stefik et al. ................... 707/797 |
| 2010/0278428 | A1 * | 11/2010 | Terao et al. .................... 382/177 |

FOREIGN PATENT DOCUMENTS

| | | |
|---|---|---|
| WO | 2005073881 | 8/2005 |
| WO | 2007047903 | 4/2007 |

OTHER PUBLICATIONS

Rocha L. M., "Adaptive Webs for Heterarchies With Diverse Communities of Users," Workshop From Intelligent Networks to the Global Brain: Evolutionary Technology, pp. 1-35 (Jul. 3, 2001).

Arasu et al., "Searching the Web," ACM, New York, NY, US, pp. 2-43 (Aug. 1, 2001).

Imai et al., "Improved Topic Discrimination of Broadcast News Using a Model of Multiple Simultaneous Topics," 1997 IEEE International Conference on Acoustics, Speech, and Signal Processing (ICASSP'97), Apr. 1997, pp. 727-730, vol. 2.

Anonymous "TF-IDF," Wikipedia, the free encyclopedia (Jul. 23, 2007).

Akiko Aizawa, "An Information-Theoretic Perspective of TF-IDF Measures," Information Processing and Management, Elsevier Science Ltd. , vol. 39, No. 1, pp. 45-65 (Jan. 1, 2003).

C. Anderson, "The Long Tail: Why the Future of Business is Selling Less of More," 2006, Chapter 1, pp. 1-26, Hyperion Press, New York.

Schutze H., "The Hypertext Concordance: A Better Back-of-the-Book Index," 1998, Proceedings of Workshop on Computational Technology, pp. 101-104, Montreal, Canada.

Arampatzis et al., "An Evaluation of Linguistically-Motivated Indexing Schemes," 2000, Proceedings of the BCSIRSG.

Biebricher et al., "The Automatic Indexing System AIR/PHYS— 1997, From Research to Application," In Readings in Information Retrieval, Morgan Kaufmann Publishers, San Francisco.

G. Sacco, "Dynamic Taxonomies and Guided Searches," Journal of the American Society for Information Science and Technology, vol. 57, Issue 6, Apr. 2006.

Brin et al., "The Anatomy of a Large-Scale Hypertextual Web Search Engine," Paper presented at the Seventh International Conference on World Wide Web. Apr. 14-18, 1998, Brisbane, Australia.

Card et al., "Readings in Information Visualization: Using Vision to Think," 1999, Section 3 Interaction, pp. 231-259, 295-306, Morgan Kaufmann Publishers, San Francisco.

Chi et al., "EBooks With Indexes that Reorganize Conceptually," Paper presented at Human Factors in Computing Systems Conference Apr. 24-29, 2004, Vienna, Austria.

G. W. Furnas, "Generalized Fisheye Views," Paper presented at the Conference on Human Factors in Computing Systems, 1986, Boston, Massachusetts.

Kusek et al., "The Future of Music: Manifesto for the Digital Music Revolution," Boston: Berklee Press, 2005.

P. Pirolli, "Information Foraging Theory: Adaptive Interaction with Information," Oxford: Oxford University Press, 2007.

H. Simon, "Designing Organizations for an Information-Rich World." In Communications and the Public Interest, ed. Martin Greenberger. 37-72. The Johns Hopkins Press, 1971.

R. D. Burt, "Structural Holes and Good Ideas," American Journal of Sociology, vol. 110, No. 2, pp. 349-399, 2003.

C. Mezei, "The Digg Algorithm-Unofficial FAQ," SeoPedia, www.secopedia.org/tips-tricks/social-media/the-digg-algorithm-unofficial-faq, Nov. 2, 2006.

N. Patel, "There's More to Digg Than Meets the Eye," Pronet Advertising, www.pronetadvertising.com/articles/ theres-more-to-digg-than-meets-the-eye.html, Jan. 15, 2007.

J. Dowdell et al., "Digg's Kevin Rose on Recent Indiggnation: Fact vs. Fiction," Marketing Shift, www.marketingshift.com/2006/9/diggs-kevin-rose-recent-indiggnation.cfm, Sep. 7, 2006.

G. A. Miller, "The Magical No. Seven, Plus or Minus Two: Some Limits on Our Capacuty for Processing Information," Psychological Review, vol. 63, pp. 81-97, 1956.

J. Dowdell, "Digg Algorithm for Scoring Stories," Marketing Shift, www.marketingshift.com/2006/9/diggs-algorithm-elements-confirmed.cfm, Sep. 8, 2006.

P. Lenssen, "How Google News Indexes". See http://blogoscoped.com/archive/2006-07-28-n49.html.

A. Agarval, "How Google News works". http://labnol.blogspot.com/2005/05/how-google-news-works.html.

M. Helft, "How a Series of Mistakes Hurt Shares of United". New York Times. http://www.nytimes.com/2008/09/15/technology/15google.html?_r=1.

Nakashima et al., "Information Filtering for the Newspaper," 1997 IEEE Pacific RIM Conference NCE on Victoria, BC, Canada (Aug. 20-22, 1997), vol. 1, pp. 142-145 (Aug. 1997).

Yuan Xue et al., "An Effective News Recommendation in Social Media Based on Users' Preference," 2008 International Workshop on Education Technology and Training and 2008 International Workshop on Geoscience and Remote Sensing, IEEE, Piscataway, NJ, USA, pp. 627-631 (Dec. 21, 2008).

Bracewell et al., "Reading: A Self Sufficient Internet News System with Applications in Information and Knowledge Mining," Natural Language Processing and Knowledge Engineering, International Conference, IEEE, PI, pp. 190-196 (Aug. 1, 2007).

K. Lerman, "Social Information Processing in News Aggregation," IEEE Computer Society, vol. 11, No. 6, pp. 16-28 (Nov. 1, 2007).

G. Linden, "People Who Read This Article Also Read . . . " IEEE Spectrum, vol. 45, No. 3, pp. 46-60 (Mar. 1, 2008).

Yu et al, "PEBL: Positive Example Based Learning for Web Page Classification Using SVM," Proc. of ACM SIGKDD International Conference on Knowledge Discovery and Data Mining (2002).

* cited by examiner

SYSTEM AND METHOD FOR PROVIDING DEFAULT HIERARCHICAL TRAINING FOR SOCIAL INDEXING

FIELD

This application relates in general to digital information search and sensemaking and, in particular, to a system and method for providing default hierarchical training for social indexing.

BACKGROUND

The Worldwide Web ("Web") is an open-ended digital information repository into which new information is continually posted. The information on the Web can, and often does, originate from diverse sources, including authors, editors, collaborators, and outside contributors commenting, for instance, through a Web log, or "Blog." Such diversity suggests a potentially expansive topical index, which, like the underlying information, continuously grows and changes.

Social indexing systems provide information and search services that organize evergreen information according to the topical categories of indexes built by their users. Topically organizing an open-ended information source, like the Web, into an evergreen social index can facilitate information discovery and retrieval, such as described in commonly-assigned U.S. patent application, entitled "System and Method for Performing Discovery of Digital Information in a Subject Area," Ser. No. 12/190,552, filed Aug. 12, 2008, pending, the disclosure of which is incorporated by reference.

Social indexes organize evergreen information by topic. A user defines topics for the social index and organizes the topics into a hierarchy. The user then interacts with the system to build robust models to classify the articles under the topics in the social index using, for instance, example-based training, such as described in Id. Through the training, the system builds fine-grained topic models by generating finite-state patterns that appropriately match positive-example articles and do not match negative-example articles.

In addition, the system can build coarse-grained topic models based on population sizes of characteristic words, such as described in commonly-assigned U.S. Pat. No. 8,010,545, issued Aug. 30, 2011, the disclosure of which is incorporated by reference. The coarse-grained topic models are used to recognize whether an article is roughly on topic. Articles that match the fine-grained topic models, yet have statistical word usage far from the norm of the positive training example articles are recognized as "noise" articles. The coarse-grained topic models can also suggest "near misses," that is, articles that are similar in word usage to the training examples, but which fail to match any of the preferred fine-grained topic models, such as described in commonly-assigned U.S. Provisional Patent Application, entitled "System and Method for Providing Robust Topic Identification in Social Indexes," Ser. No. 61/115,024, filed Nov. 14, 2008, pending, the disclosure of which is incorporated by reference.

To large extent, the success of social indexing depends upon the ease of creating new indexes, yet index creation can be the most difficult step for new users, particularly when built through example-based training of index topics. The example-based approach yields well-tuned topic models for the indexes and creates patterns without requiring a user to master the skills of writing potentially-complex queries. Example-based training also provides valuable feedback for tuning topic models. Notwithstanding, example-based training requires significant work and understanding. As a preliminary step, a new user must create and name each topic, and place that topic into a topic tree. Much more work is required for training. The user must identify one or more positive-example articles for each topic and train the index using the positive-example articles. Following training, the system reports the matching articles for each topic and their scores, plus candidate "near misses" for each topic. If one or more of the near misses belong under a topic, the user can add the article to the set of positive training examples. As well, if the system reports one or more off-topic articles as matching, the user can add those articles as negative training examples.

Through this routine, a user engages in an open-ended iterative process of tuning topics. Sometimes, several cycles of adding positive and negative training examples is required until satisfactory results are obtained from the topic models. For new users wanting to see quick results from their efforts, the labor of example-based training can be a disincentive.

SUMMARY

Topic models are created without requiring a user to provide any training examples. The topic models are built based on a hierarchical topic tree using both the individual topic labels and their locations within the tree. A random sample of articles are created from given sources of information for the index and candidate topic models, or patterns, are generated. The patterns are ranked according to a set of heuristic rules about labels, word and label uniqueness, and the relationships expressed by topic trees. The resulting topic models are less accurate and precise than those created by example-based training because the constraints used in default training are less specific. On the other hand, the approach requires much less work. While a user always needs to create a topic tree to specify the index topics, no additional work providing examples is needed and the user gets a draft index.

One embodiment provides a system and method for providing default hierarchical training for social indexing. Articles of digital information for social indexing are maintained. A hierarchically-structured tree of topics is specified. Each topic includes a label that includes one or more words. Constraints inherent in the literal structure of the topic tree are identified. For each topic in the topic tree, a topic model that includes at least one term derived from the words in at least one of the labels is created. The topic models for the topic tree are evaluated against the constraints. Those of the topic models, which best satisfy the constraints are identified.

Creating default social indexes enables new users can get started more quickly than when provided with example-based training alone, and provides a good basis for later switching to the example-based training when topic boundaries within the social index need fine-tuning. The system creates better answers than found by simply concatenating topic labels by generating and evaluating alternative candidate patterns against heuristical criteria and biases.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly,.the drawings and detailed description are to be regarded as illustrative in nature and not as restrictive.

BRIEF DESCRIPTION OF THE DRAWINGS

FIGS. 13-14 are screen shot diagrams showing, by way of example, results of default hierarchical training for social indexing.

DETAILED DESCRIPTION

Glossary

Figure 1:
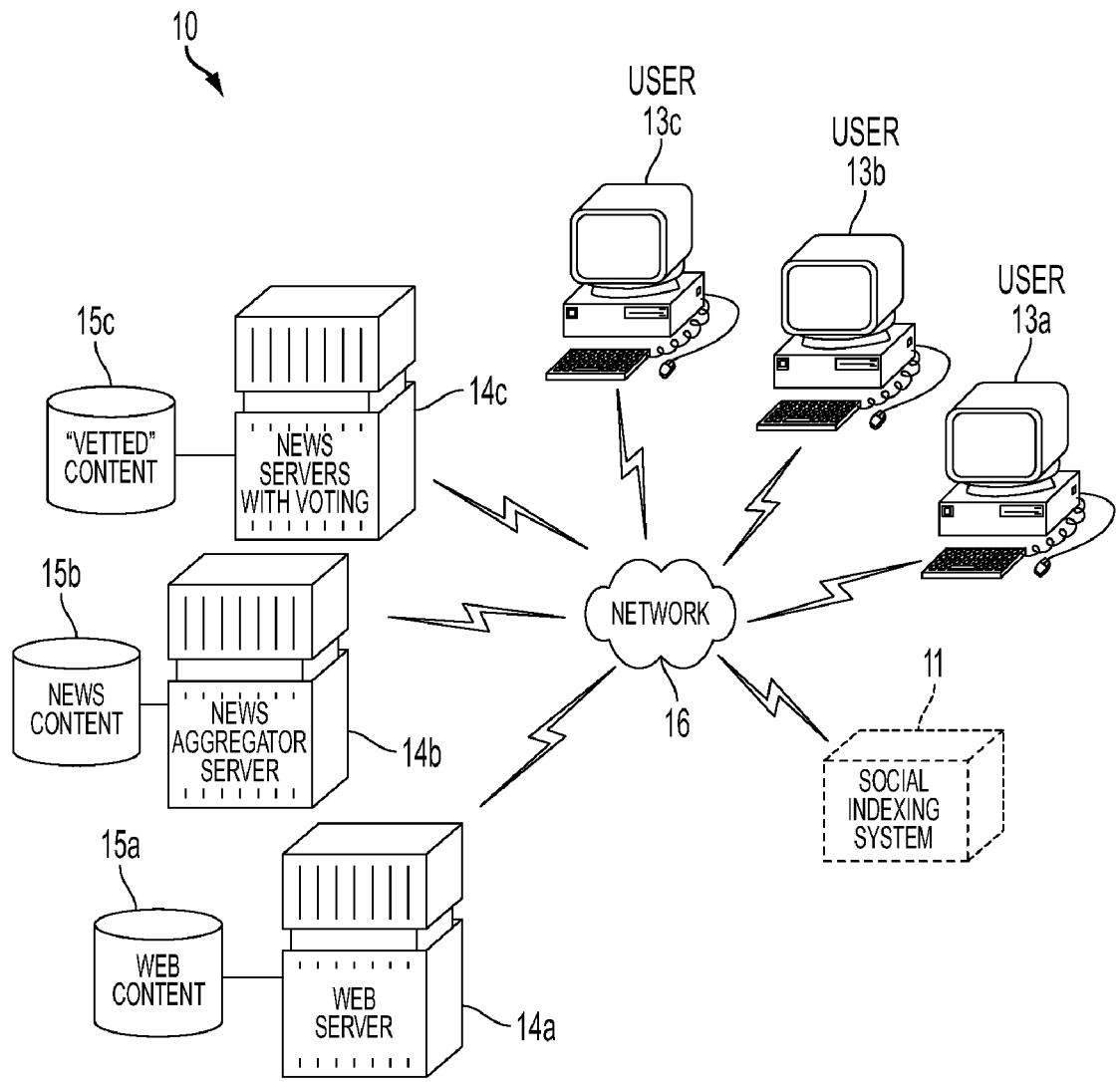
FIG. 1 is a block diagram showing an exemplary environment for digital information.

The following terms are used throughout and, unless indicated otherwise, have the following meanings:

Corpus: A collection or set of articles, documents, Web pages, electronic books, or other digital information available as printed material.

Document: An individual article within a corpus. A document can also include a chapter or section of a book, or other subdivision of a larger work. A document may contain several cited pages on different topics.

Cited Page: A location within a document to which a citation in an index, such as a page number, refers. A cited page can be a single page or a set of pages, for instance, where a subtopic is extended by virtue of a fine-grained topic model for indexing and the set of pages contains all of the pages that match the fine-grained topic model. A cited page can also be smaller than an entire page, such as a paragraph, which can be matched by a fine-grained topic model.

Subject Area: The set of topics and subtopics in a social index, including an evergreen index or its equivalent.

Topic: A single entry within a social index characterizing a topical category. In an evergreen index, a topic has a descriptive label and is accompanied by a fine-grained topic model, such as a pattern, that is used to match documents within a corpus.

Subtopic: A single entry hierarchically listed under a topic within a social index. In an evergreen index, a subtopic is also accompanied by one or more topic models.

Fine-grained topic model: This topic model is based on finite state computing and is used to determine whether an article falls under a particular topic. Each saved fine-grained topic model is a finite-state pattern, similar to a query. This topic model is created by training a finite state machine against positive and negative training examples.

Coarse-grained topic model: This topic model is based on characteristic words and is used in deciding which topics correspond to a query. Each saved coarse-grained topic model is a set of characteristic words, which are important to a topic, and a score indicating the importance of each characteristic word. This topic model is also created from positive training examples, plus a baseline sample of articles on all topics in an index. The baseline sample establishes baseline frequencies for each of the topics and the frequencies of words in the positive training examples are compared with the frequencies in the baseline samples. In addition to use in generating topical sub-indexes, coarse-grained models can be used for advertisement targeting, noisy article detection, near-miss detection, and other purposes.

Community: A group of people sharing main topics of interest in a particular subject area online and whose interactions are intermediated, at least in part, by a computer network. A subject area is broadly defined, such as a hobby, like sailboat racing or organic gardening; a professional interest, like dentistry or internal medicine; or a medical interest, like management of late-onset diabetes.

Augmented Community: A community that has a social index on a subject area. The augmented community participates in reading and voting on documents within the subject area that have been cited by the social index.

Evergreen Index: An evergreen index is a social index that continually remains current with the corpus.

Social Indexing System: An online information exchange infrastructure that facilitates information exchange among augmented communities, provides status indicators, and enables the passing of documents of interest from one augmented community to another. An interconnected set of augmented communities form a social network of communities.

Information Diet: An information diet characterizes the information that a user "consumes," that is, reads across subjects of interest. For example, in his information consuming activities, a user may spend 25% of his time on election news, 15% on local community news, 10% on entertainment topics, 10% on new information on a health topic related to a relative, 20% on new developments in their specific professional interests, 10% on economic developments, and 10% on developments in ecology and new energy sources. Given a system for social indexing, the user may join or monitor a separate augmented community for each of his major interests in his information diet.

Label: A topic label from a hierarchical index of topics.

Duplicated Topic Label: A topic label that is used on more than one topic within a hierarchical index.

Common Ancestor: Given two topics in a topic tree, a common ancestor is a topic that is an ancestor of both of the topics.

Word: A stemmed word that appears within a topic label.

Duplicated Word: A word that appears in more than one topic label in any of its forms.

Local Topic Word: A word that appears in a topic's label for a given topic.

Parent Word: A word that appears in the label of the topic's parent.

Term: A word, n-gram, or group of words that appear in a pattern that functions as a default topic model. The words in each term can be derived from stemmed versions of the words in the label.

Preferred Pattern: A conjunction or in-gram pattern that uses the same words that appear in a topic label. For example, if the topic label is "Onset Venture," the preferred pattern is either the n-gram "{onset venture}" or the conjunction "[onset venture]," skipping any stop words. If the topic label is a single word, for instance, "Mayfield," the preferred pattern is the single word in stemmed form.

Complexity (or Simplicity) Score: A score reflecting the structure of a default candidate pattern.

Valid Pattern: A pattern that satisfies the hard constraints.

Digital Information Environment

A digital information infrastructure includes public data networks, such as the Internet, standalone computer systems, and other open-ended repositories of electronically-stored information. FIG. 1 is a block diagram showing an exemplary environment 10 for digital information, which includes a social indexing system 11 that supports social indexing activities. A digital data communications network 16, such as the Internet, provides an infrastructure for exchange of digital information. Other digital information exchange infrastructures, for instance, a non-public corporate enterprise network, are possible. The network 16 provides interconnectivity to diverse and distributed information sources and consumers that respectively supply and consume the digital information. Authors, editors, collaborators, and outside contributors continually post articles, Web pages, and the like to the network 16, which are maintained as a distributed data corpus though Web servers 14a, news aggregator servers 14b, news servers with voting 14c, and other data repositories that serve as information sources. These sources respectively serve Web content 15a, news content 15b, community-voted or "vetted" content 15c, and other information to users that access the network 16 through user devices 13a-c, such as personal computers, as well as other servers that all function as information consumers. For simplicity, only user devices will be discussed, although servers and other non-user device information consumers may similarly search, retrieve, and use information in the corpus.

In general, each user device 13a-c is a Web-enabled device that executes a Web browser or similar application, which supports interfacing to and information exchange and retrieval with the servers 14a-c. Both the user devices 13a-c and servers 14a-c include components conventionally found in general purpose programmable computing devices, such as a central processing unit, memory, input/output ports, network interfaces, and non-volatile storage, although other components are possible. Moreover, other information sources in lieu of or in addition to the servers 14a-c, and other information consumers, in lieu of or in addition to user devices 13a-c, are possible.

A social indexing system 11 supplies articles topically organized under an evergreen index through social indexing, such as described in commonly-assigned U.S. Patent Application, entitled "System and Method for Performing Discovery of Digital Information in a Subject Area," Ser. No. 12/190,552, filed Aug. 12, 2008, pending, the disclosure of which is incorporated by reference. The social indexing system 11 also determines which topics are currently "hot" and which topics have turned "cold" to meet a user's need for recent information, such as described in commonly-assigned U.S. Patent Application, entitled "System and Method for Managing User Attention by Detecting Hot and Cold Topics in Social Indexes," Ser. No. 12/360,834, filed Jan. 27, 2009, pending, the disclosure of which is incorporated by reference. Finally, the social indexing system 11 groups and displays articles by relevance bands, which are sorted by time and filtered by time regions, such as described in commonly-assigned U.S. Patent Application, entitled "System and Method for Using Banded Topic Relevance and Time for Article Prioritization," Ser. No. 12/360,823, filed Jan. 27, 2009, pending, the disclosure of which is incorporated by reference.

Figure 2:
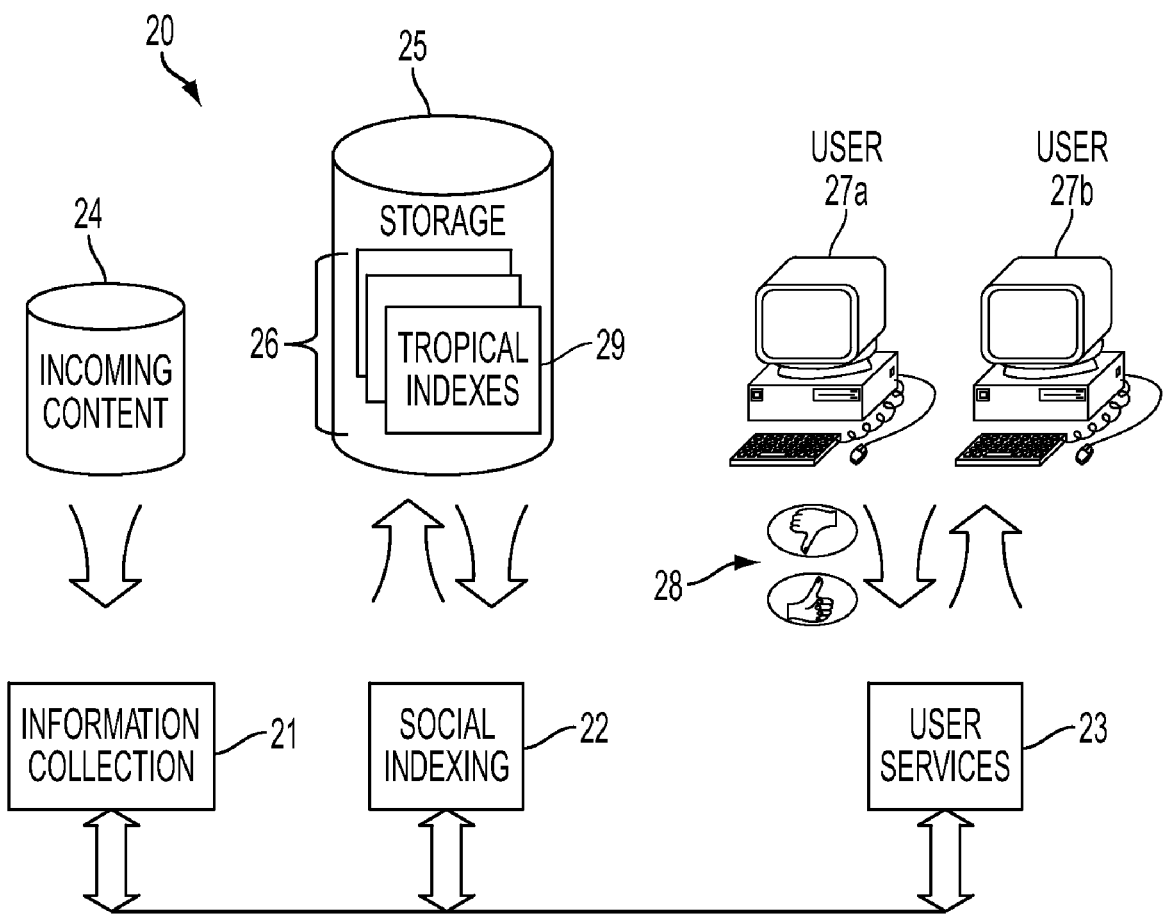
FIG. 2 is a functional block diagram showing principal components used in the environment of FIG. 1.

From a user's point of view, the environment 10 for digital information retrieval appears as a single information portal, but is actually a set of separate but integrated services. FIG. 2 is a functional block diagram showing principal components 20 used in the environment 10 of FIG. 1. Additional components may be required to provide other related digital information activities, such as digital information discovery, prospecting, orienting, and retrieval.

The components 20 can be loosely grouped into three primary functional modules, information collection 21, social indexing 22, and user services 23. Other functional modules are possible. Additionally, the functional modules can be implemented on the same or separate computational platform. Information collection 21 obtains incoming content 24, such as Web content 15a, news content 15b, and "vetted" content 15c, from the open-ended information sources, including Web servers 14a, news aggregator servers 14b, and news servers with voting 14, which collectively form a distributed corpus of electronically-stored information. The incoming content 24 is collected by a media collector to harvest new digital information from the corpus. The incoming content 24 can typically be stored in a structured repository, or indirectly stored by saving hyperlinks or citations to the incoming content in lieu of maintaining actual copies.

The incoming content 24 may be stored in multiple representations, which differ from the representations in which the information was originally stored.

Different representations could be used to facilitate displaying titles, presenting article summaries, keeping track of topical classifications, and deriving and using fine-grained topic models. Words in the articles could also be stemmed and saved in tokenized form, minus punctuation, capitalization, and so forth. Moreover, fine-grained topic models created by the social indexing system 11 represent fairly abstract versions of the incoming content 24 where many of the words are discarded and mainly word frequencies are kept.

The incoming content 24 is preferably organized under at least one topical index 29 that is maintained in a storage device 25. The topical index 29 may be part of a larger set of topical indexes 26 that covers all of the information. The topical index 29 can be an evergreen index built through social indexing 22, such as described in commonly-assigned U.S. patent application "System and Method for Performing Discovery of Digital Information in a Subject Area," Ser. No. 12/190,552, filed Aug. 12, 2008, pending, the disclosure of which is incorporated by reference. The evergreen index contains fine-grained topic models, such as finite state patterns, that can be used to test whether new information falls under one or more of the topics in the index. Social indexing 22 applies supervised machine learning to bootstrap training material into the fine-grained topic models for each topic and subtopic in the topical index 29.

Alternatively, social indexing 22 can perform default training to form topic models in a self-guided fashion based on a hierarchical topic tree using both the individual topic labels and their locations within the tree, as further described below beginning with reference to FIG. 3. Once trained, the evergreen index can be used for index extrapolation to automatically categorize new incoming content 24 into topics for pre-selected subject areas.

User services 23 provide a front-end to users 27a-b to access the set of topical indexes 26 and the incoming content 24, to perform search queries on the set of topical indexes 26 or a single topical index 29, and to access search results, top indexes, and focused sub-indexes. In a still further embodiment, each topical index 29 is tied to a community of users, known as an "augmented" community, which has an ongoing interest in a core subject area. The community "vets" information cited by voting 28 within the topic to which the information has been assigned.

Simple Default Training

Figure 4:
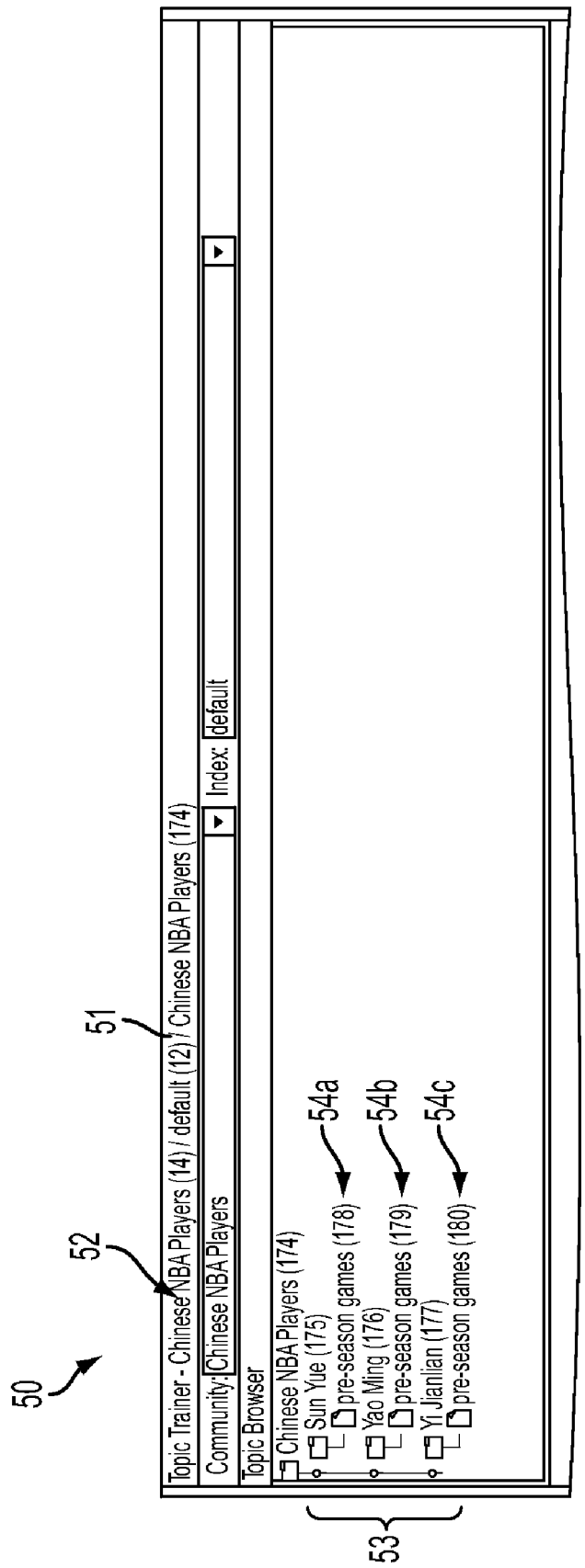
Figure 5:
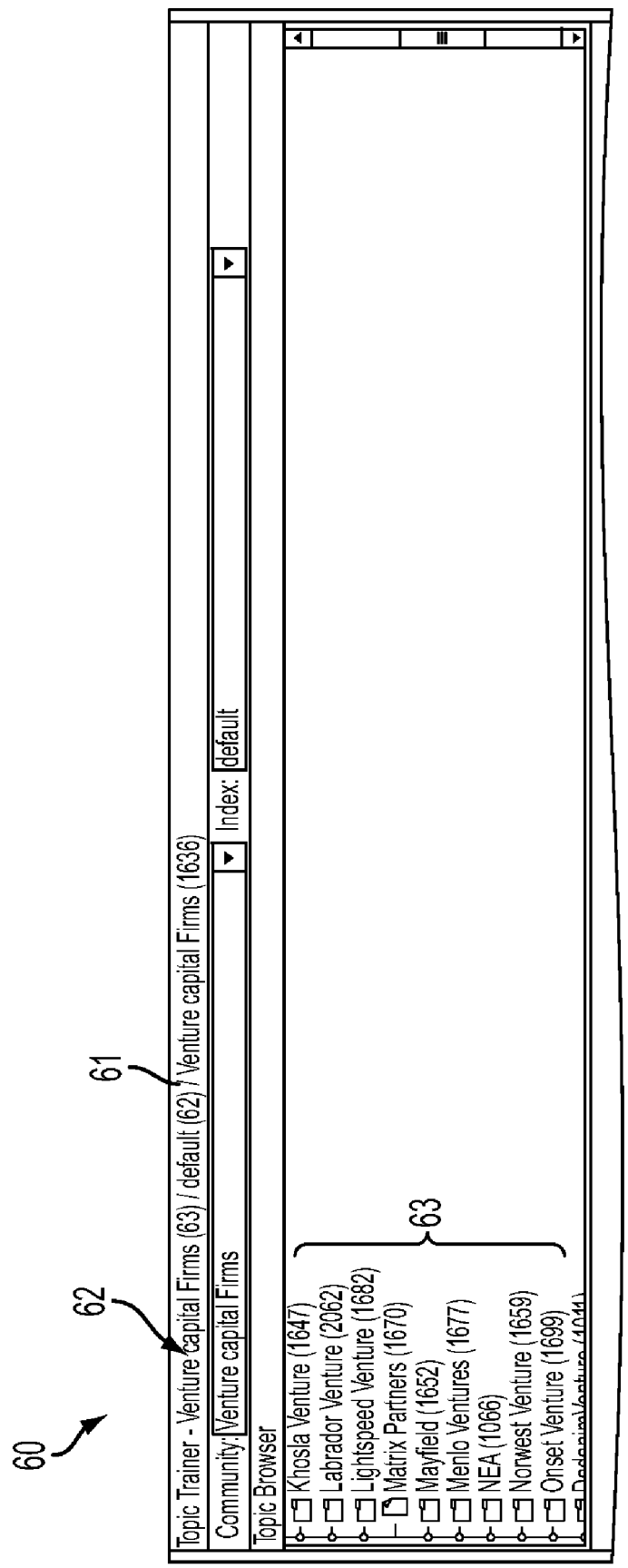

In most fundamental form, a default social index can be formed by extracting the words from each topic label and creating a conjunction of the words, minus any stop words, as a topic model or pattern. This approach, however, is not without shortcomings. FIGS. 3-5 are screen shot diagrams 40, 50, 60 showing, by way of example, failure modes 41, 51, 61 of simple default hierarchical training for social indexing.

Figure 3:
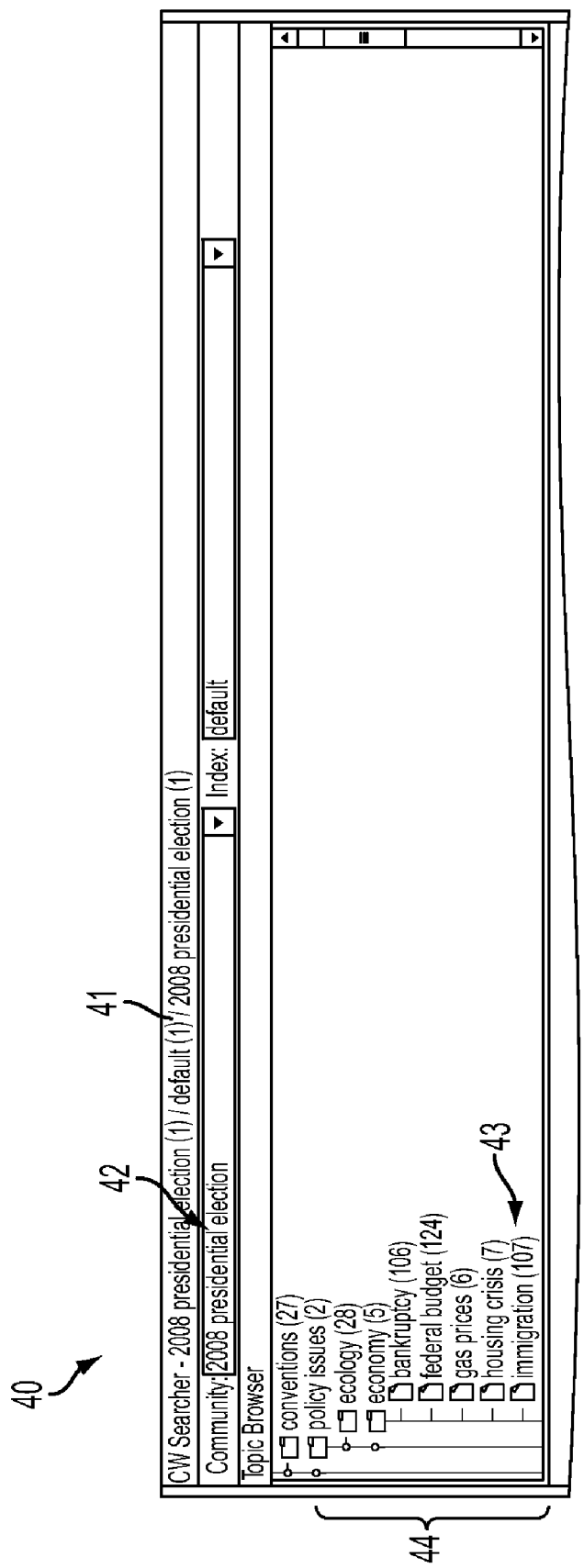
FIGS. 3-5 are screen shot diagrams showing, by way of example, failure modes of simple default hierarchical training for social indexing.

Referring first to FIG. 3, part of a topic hierarchy for an index on the 2008 Presidential election 42 is depicted. One of the topics 43 is "housing crisis," which is organized within the hierarchical index 44 under "policy issues>economy>housing crisis." Applying the topic-label-word-extraction-and-conjunction ("simple default training") approach, the resulting pattern would simply he "[hous crisi]" with the terms stemmed, which is a conjunction requiring that any matching article contain both the words "house" and "crisis." By comparison, example-based training for this topic results in the pattern "(mortgage {hous crisi})." This pattern is a disjunction of a single term, "mortgage," and a 2-word n-gram, "housing crisis." The pattern matches any article containing either the word "mortgage" or the n-gram "housing crisis." These contrasting examples show how example-based training can draw on more information resources in searching for a solution. The candidate pattern created through example-based training uses the word "mortgage," which is not present in the topic's title and is drawn from the characteristic words of the articles given as positive training examples.

For the articles from the sources in this index, both the simple default training and example-based training patterns did a credible job. Although the simple default pattern found many of the correct articles, the pattern also matched articles about a "crisis faced by the House of Representatives" and missed some articles about the "mortgage meltdown." In contrast, the example-based pattern lacked these limitations, and could evolve to recognize more complex topic boundaries, given more positive and negative examples.

In other cases, the simple default training fails drastically. Referring next to FIG. 4, a training index for "Chinese NBA players" 52 is depicted. This training index is organized first by player name 53. Under each player, additional topics might be added in parallel. The subtopic "pre-season game" 54*a-c* is shown for all three players. Here, the simple default trainer creates the same pattern "[pre-season game]" for all of the subtopics having that name, yielding exactly the same set of articles for pre-season games for all three players.

A simple variation on the simple default trainer could increase model specificity by including terms from ancestor topics drawn from the topic hierarchy. For example, the trainer could generate the pattern "[Sun Yue pre season game]" for the first of the three duplicate-label subtopics. This variation suggests that constraints on the default pattern for a topic can arise from relationships to other nodes in the topic tree. However, this variation of including parent words also has problems. As the number of words in a conjunction increases, the number of matching articles necessarily decreases. For example, articles about pre-season games of Sun Yue that include the word "Yue" but not the word "Sun" would be missed by the default pattern.

Yet another variation is to include some, but not all, of the words from parent topics. Referring finally to FIG. 5, a topic tree, which was drawn from an index about venture capital firms 62 is depicted. Many venture capital firms use the same words in their names 63, such as "venture" and "capital." Additional information is needed to evaluate which words to use in candidate patterns. One source of information is the set of articles retrieved from sources. Up to a point, patterns for a topic that match more articles are preferred over patterns that match fewer articles. By itself, however, this rule can fail. For example, in a social index on the "2008 Presidential Elections," the word '2008" will match almost every article. As a result, adding a high-frequency word would add little to the discriminatory power of a pattern in a topic model. There is an approximately "right" number of articles for training, but that number is not a sharp cut-off.

To summarize, candidate patterns can be generated from the terms that appear in topic labels. Although simple conjunctions work for some indexes, that approach by itself is subject to failure in cases where:

When topic labels are duplicated, words and constraints from ancestor nodes must be taken into account.

Words from a common ancestor of nodes with duplicated labels do not discriminate between them.

Using all of the words from all of the ancestor nodes in the tree can result in conjunctions that are too limiting.

When selecting additional words to include in the patterns, information about the word frequencies need to be taken into account.

Default Hierarchical Training

Figure 6:
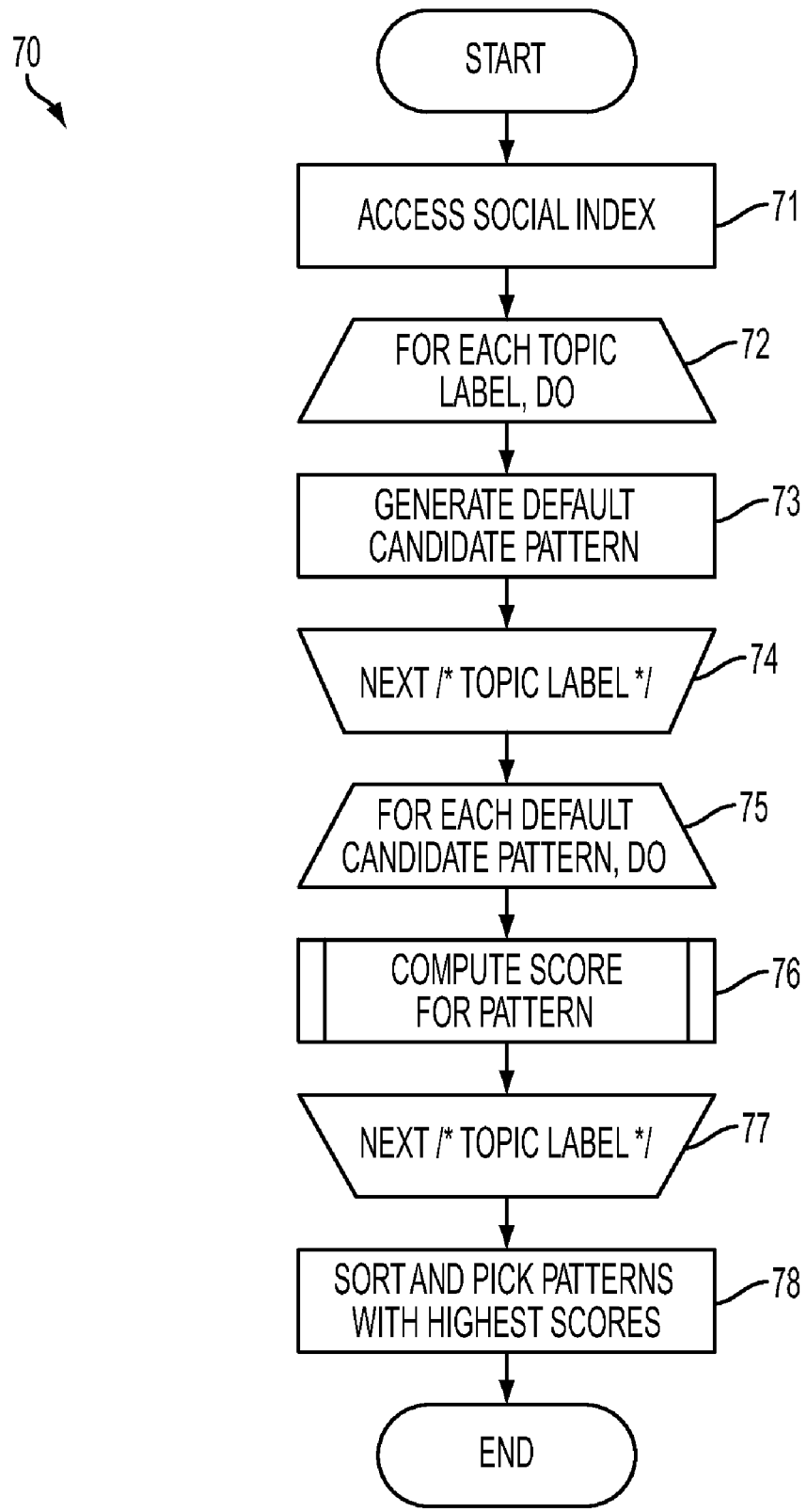
FIG. 6 is a flow diagram showing a method for providing default hierarchical training for social indexing in accordance with one embodiment.

Default hierarchical training addresses the shortcomings of simple default training to generate a default index, which is often entirely satisfactory for organizing the subject matter. FIG. 6 is a flow diagram showing a method 70 for providing default hierarchical training for social indexing in accordance with one embodiment. The method is performed as a series of process or method steps performed by, for instance, a general purpose programmed computer, such as server.

A social index must be specified and accessed (step 71). The social index can be created by a user as a hierarchically-structured topic tree to specify the index topics, or can originate from some other index source. The topic tree includes topic labels, some of which may be duplicated wholly or in part. Each topic label in the social index is iteratively processed (steps 72-74) and, during each iteration, a default candidate pattern is generated (step 73). Each default candidate pattern can include:

A single-word pattern;

An n-gram made from a complete topic label; or

A conjunction of up to three terms made from single words, n-grams, or disjunctions.

Other patterns, such as disjunctions or sequences, could also be included, either in addition to or in lieu of conjunctions. Any default candidate patterns that use a word more than once are deleted. In addition, in generating the default candidate patterns, words that appear in the label of a topic, the label of the topic's parent, or the labels of any other ancestors of a topic are used. Words that appear in other labels in the index are considered during default candidate pattern evaluation.

Figure 7:
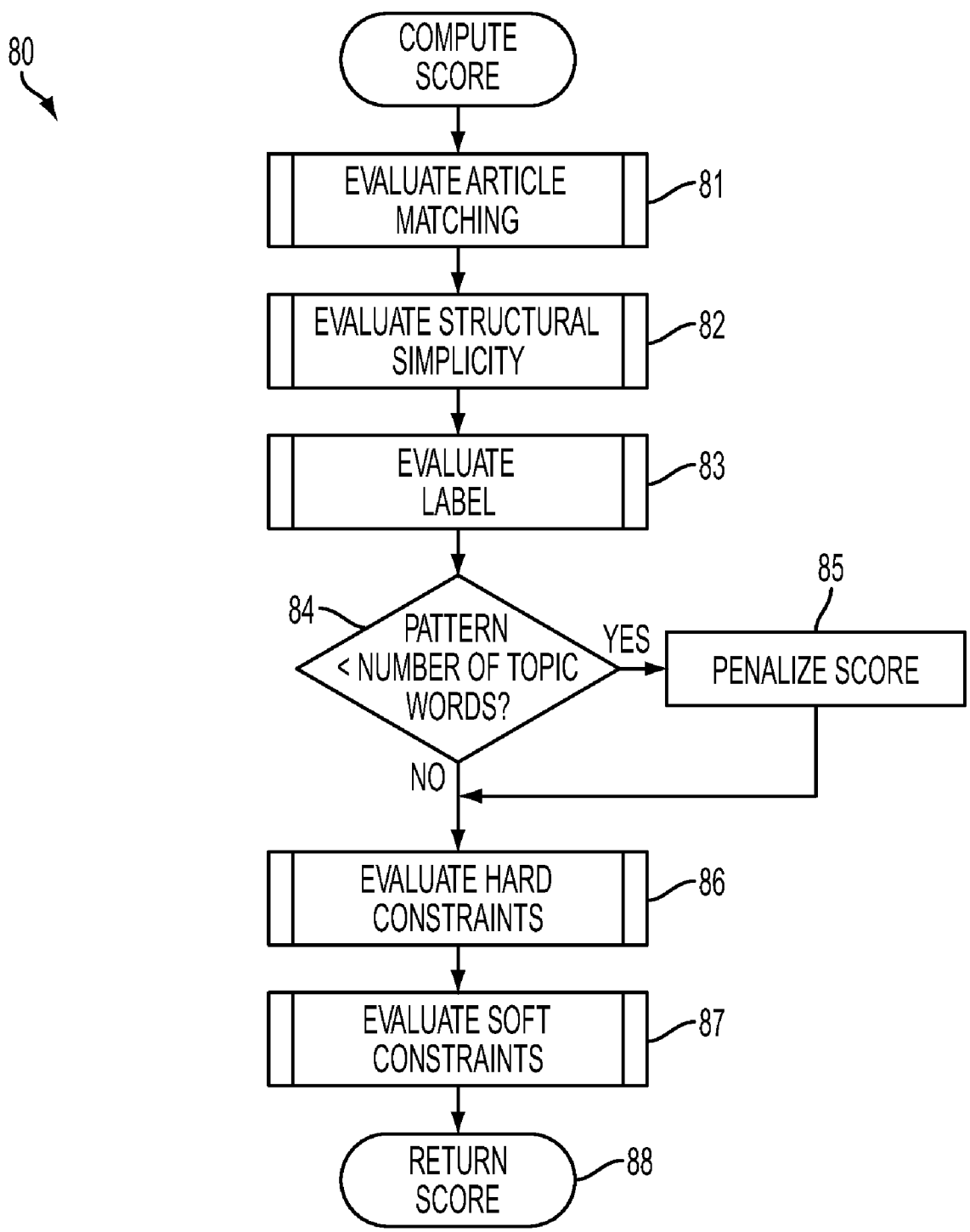
FIG. 7 is a flow diagram showing a routine for computing a default candidate pattern score for use with the method of FIG. 6.

Each default candidate pattern is the iteratively processed (steps 75-77) and, during each iteration, a score for the pattern is computed (step 76), as further described below beginning with reference to FIG. 7. However, to summarize the scoring process, which interprets inferred constraints as patterns that are matched against articles:

A default candidate pattern is initially assigned a score based on its article score between 0 and 80 points.

The minimum of half the article score and a complexity score is added.

If the default candidate pattern corresponds to the preferred pattern for the topic, a minimum of half the article score and 10 points are added to the score.

If the default candidate pattern violates a hard rule, the pattern is penalized 100 points.

If the candidate violates a soft rule, the pattern is penalized 20 points per violation.

Variations in the numbers of points assigned to each default candidate pattern are not crucial to the scoring process.

Finally, the patterns are ranked based on their scores and the highest scoring patterns are selected for the default hierarchical index (step 78).

Default Candidate Pattern Scoring

Several factors are considered in evaluating default patterns. FIG. 7 is a flow diagram showing a routine 80 for computing a default candidate pattern score for use with the method of FIG. 6. In one embodiment, scores for default candidate patterns are computed and the patterns with the highest scores are picked. The total score for a considered pattern is intended to fall on a hundred point scale, although other scales could apply. A default candidate pattern can earn up to 80 points by matching the "right" number of articles. In addition, the pattern can earn up to 10 points by having the "right" kind of structure, and up to 10 points for being similar in the "right" way to a topic label.

Figure 8:
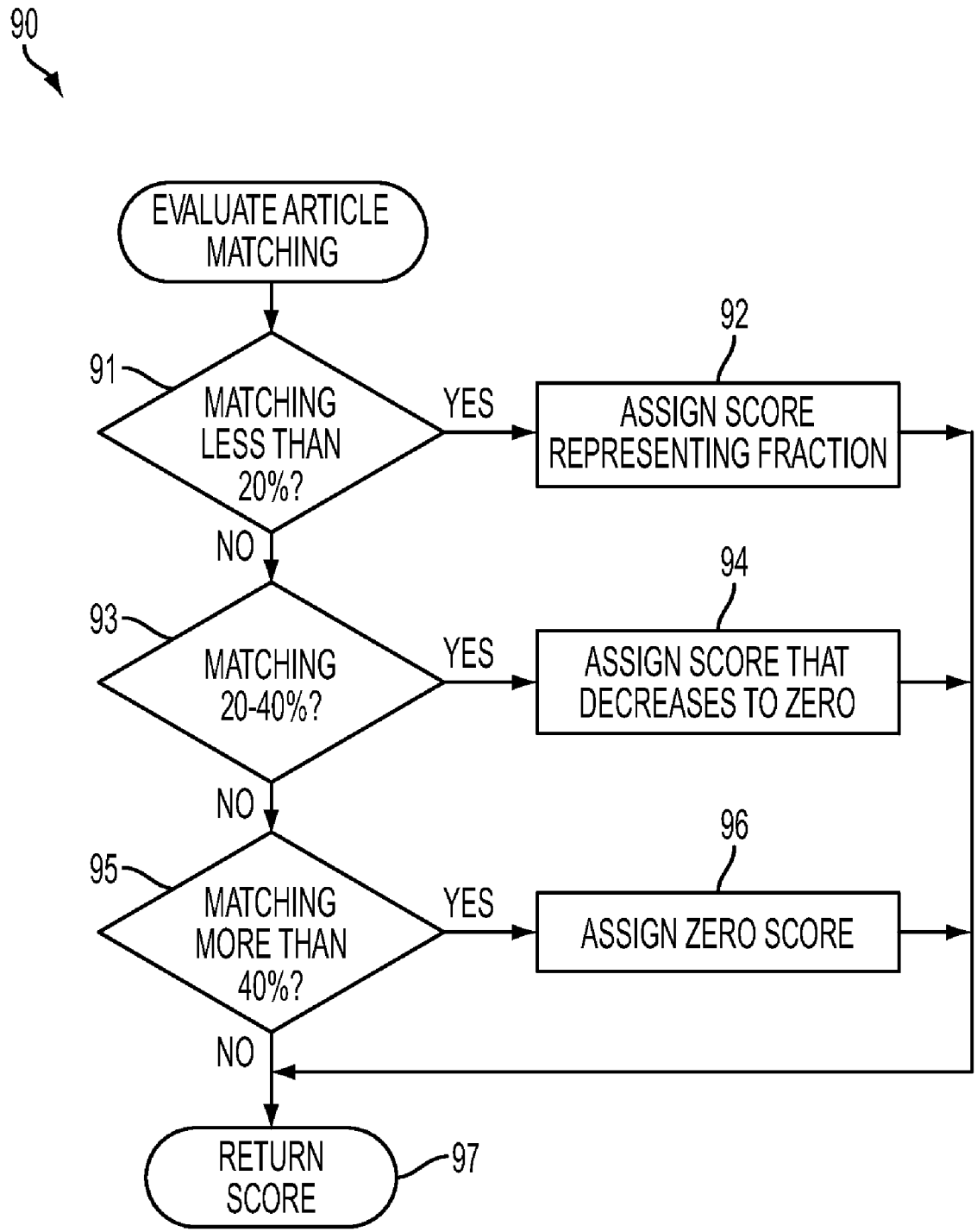
FIG. 8 is a flow diagram showing a routine for evaluating article matching for use with the routine of FIG. 7.

Several factors contribute to scoring. The factors can be quantified as percentages, or other metrics, to consider article matching, structural simplicity, and label bonus as factors in pattern evaluation, with approximately the given percentages of influence in typical cases. The factors include:

70%—Article matching (step 81), as further described below with reference to FIG. 8. Those topic models that proportionately match a percentage of the articles closest to an ideal percentage are favored.

Figure 9:
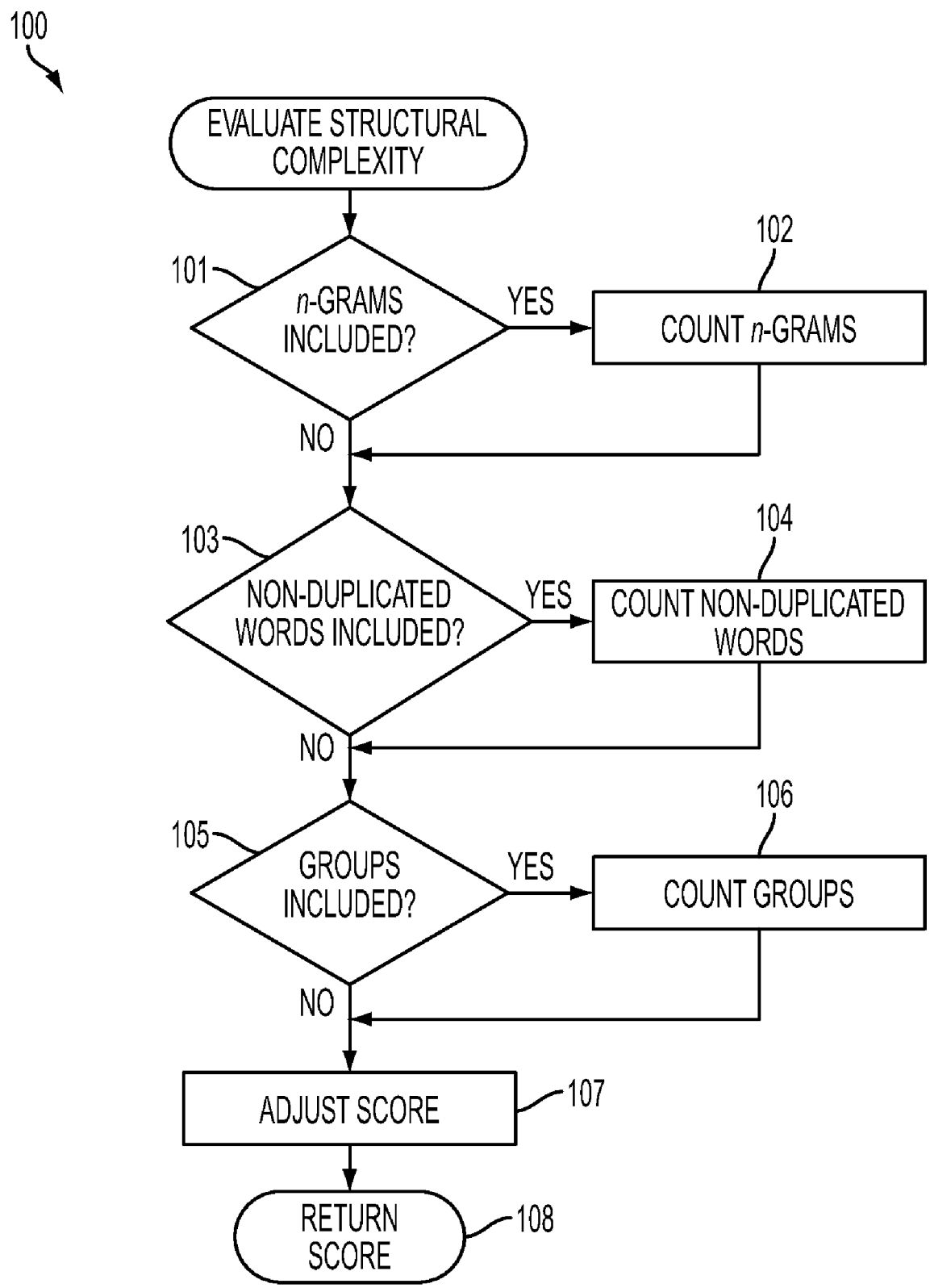
FIG. 9 is a flow diagram showing a routine for evaluating structural complexity for use with the routine of FIG. 7.

10%—Structural simplicity (step 82), as further described below with reference to FIG. 9. Specific types of structural complexity enhance the ability of a topic model to discriminate and are therefore favored.

Figure 10:
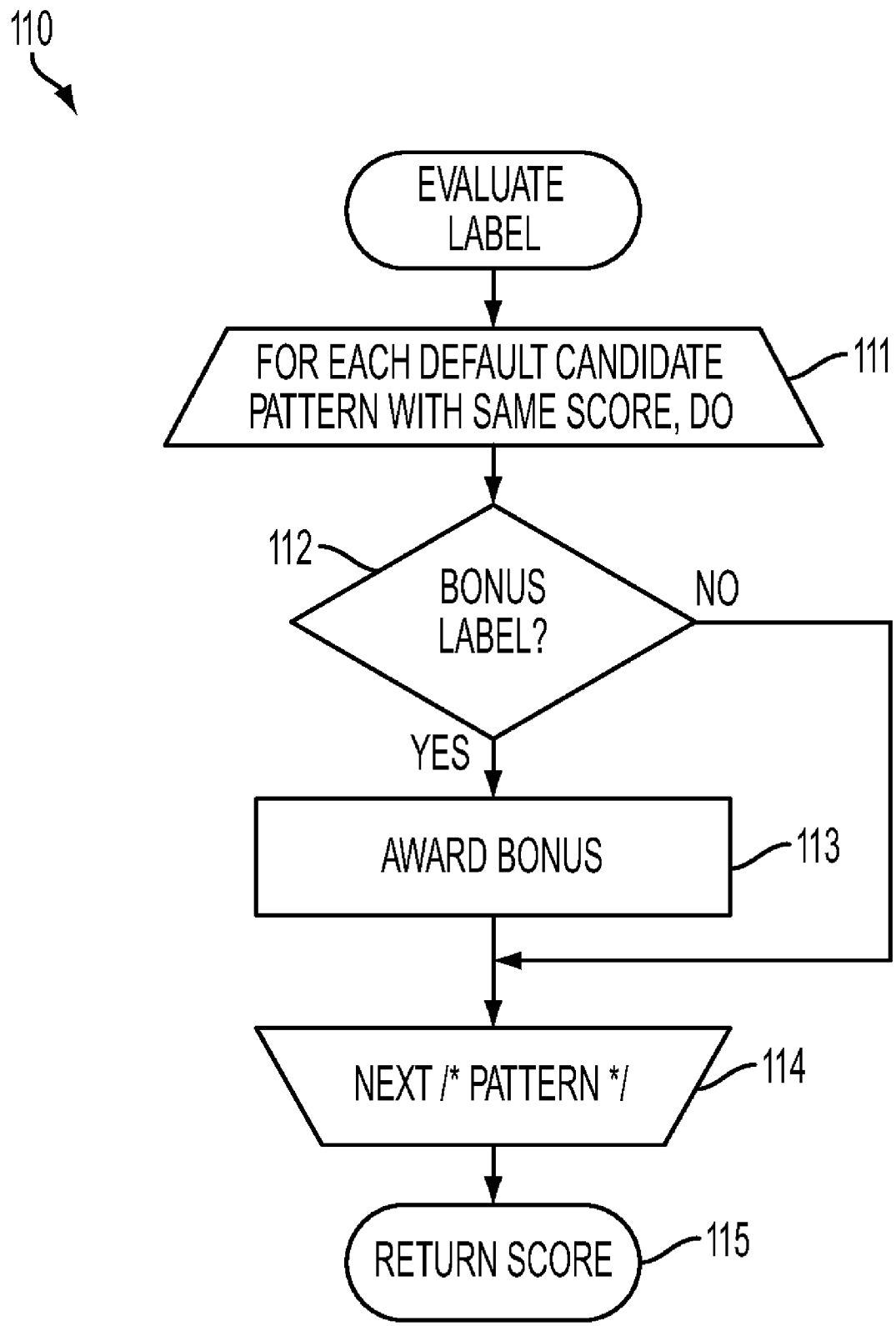
FIG. 10 is a flow diagram showing a routine for evaluating labels for use with the routine of FIG. 7.

20%—label bonus (step 83), as further described below with reference to FIG. 10. A topic model that includes a bonus label will tie-break other equally scoring topic models.

In addition, single word patterns tend to match more articles than multiple word patterns. Consequently, the default candidate pattern score is adjusted to reduce the advantage of high article counts due to single word patterns. Thus, if a topic has a word label with two or more words and the proposed default candidate pattern has fewer words than the word label (step 84), the article score is penalized by half (step 85).

Figure 11:
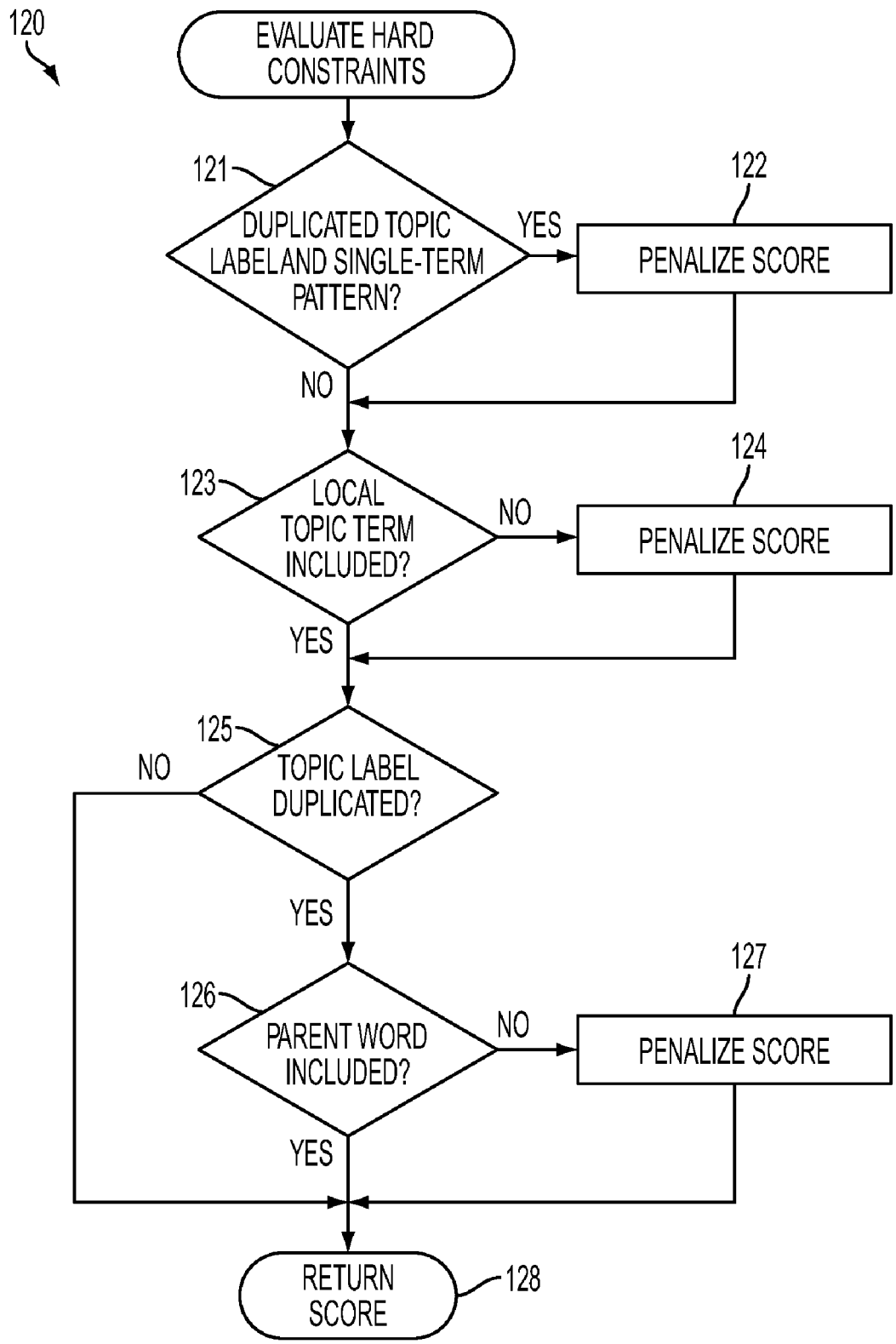
FIG. 11 is a flow diagram showing a routine for evaluating hard constraints for use with the routine of FIG. 7.
Figure 12:
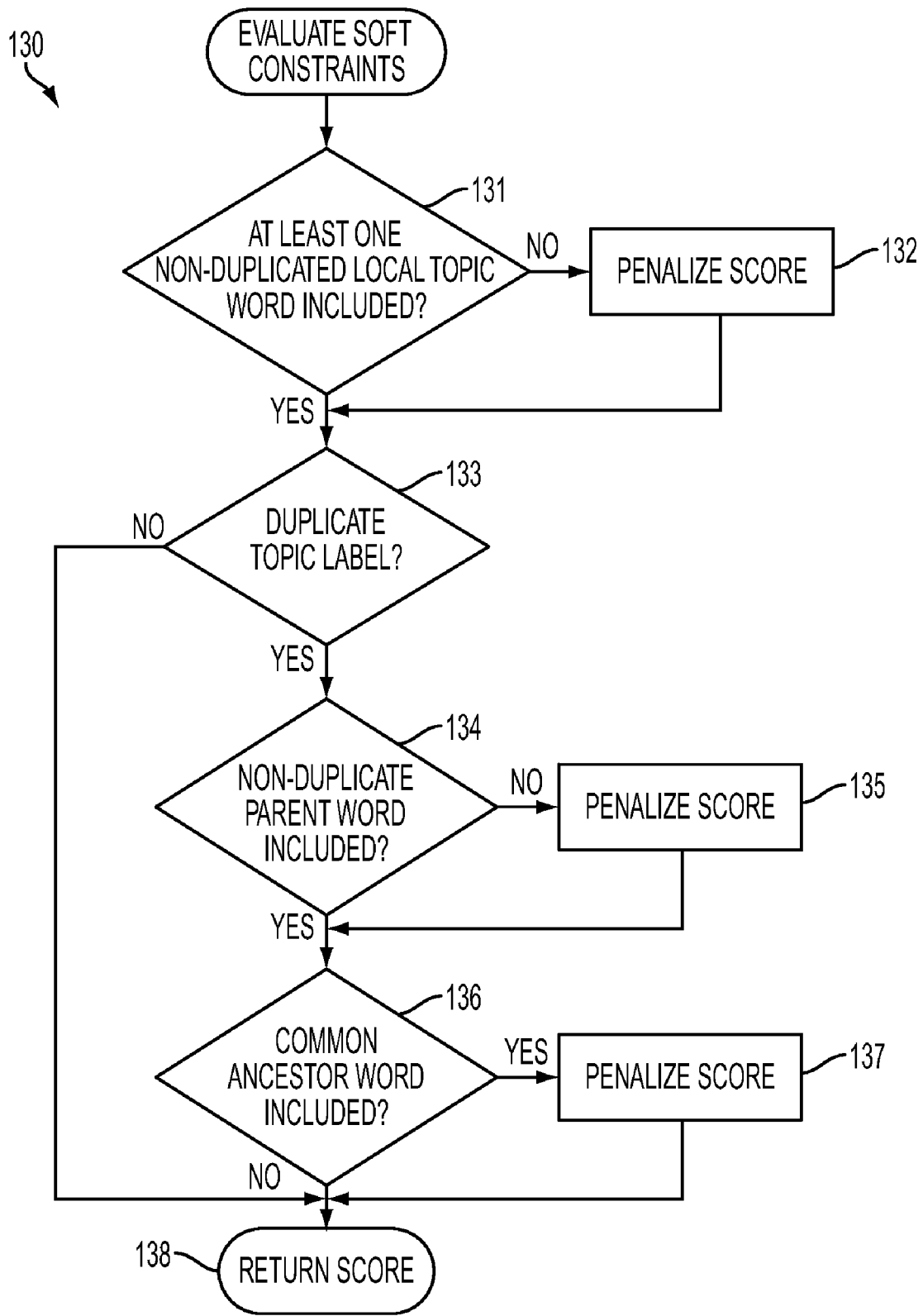
FIG. 12 is a flow diagram showing a routine for evaluating soft constraints for use with the routine of FIG. 7.

The default candidate patterns are also checked against hard constraints (step 87) and soft constraints (step 88), as further described below respectively with reference to FIGS. 11 and 12. The hard constraints represent immutable rules, while the soft constraints are permissive. Violations of hard constraints severely penalize or disfavor the scores earned by the topic models. On the other hand, violations of soft constraints merely discount the scores. Rejected patterns, such as those violating any of the hard constraints or violating too many soft constraints, can have scores less than zero. Following evaluation (steps 81-87), the resulting score is returned (step 88).

Article Matching Evaluation

The biggest single factor in evaluating a default candidate pattern is the number of articles that the pattern matches, contributing up to 70% to the total score, although other approaches that assign considerations of article matching to a suitable majority role in scoring could be used. FIG. 8 is a flow diagram showing a routine 90 for evaluating article matching for use with the routine 80 of FIG. 7. In an ideal index, each topic matches an equal share of the articles at the same level. However, such matching seldom works out in practice since some topics are invariably more important than other topics. Most of the default candidate patterns that satisfy hard constraints (the "valid" patterns) match a minority of the articles and most patterns do not match any articles at all. Moreover, of the valid candidates, patterns that match the most articles are generally preferred.

Although patterns that match more articles are generally favored over articles that match fewer articles, default candidate patterns can match too many articles. Patterns that are overly prolific, such as matching more than about 20% of the test articles, are usually too non-discriminating to be useful. As a result, default candidate pattern evaluation favors patterns that match the most articles up to an "ideal maximum" without employing a sudden, discontinuous cut-off:

Candidates matching less than 20% of the articles (step 91) are assigned a score representing the fraction of the ideal number of articles (step 92).

Candidates matching more than 20-40% of the articles (step 93) are assigned a score, which decreases to zero as the number of articles matched approaches 40% (step 94).

Articles matching >40% of the articles (step 95) are judged as too prolific and are assigned a score of zero (step 96).

Following article matching evaluation (steps 91-96), the resulting score is returned (step 97).

Structural Complexity Evaluation

Structural complexity scoring is a secondary factor in default candidate pattern evaluation, contributing up to 20% to the total score, although other approaches that assign considerations of structural complexity to a suitable minority role in scoring could be used. FIG. 9 is a flow diagram showing a routine 100 for evaluating structural complexity for use with the routine 80 of FIG. 7. Three factors are considered in computing a complexity score:

Number of n-grams (step 101). In general, n-grams are highly discriminating pattern elements and default candidate patterns are rewarded in relation to the number of n-grams included in the pattern (step 102).

Number of non-duplicated words (step 103). Non-duplicated words are more discriminating than duplicated words. A pattern with several non-duplicated words is likely to be more discriminating than a pattern with fewer or no non-duplicated words. The number of non-duplicated words is counted (step 104).

Number of groups (step 105). Groups of words are conjunctions and disjunctions of terms (step 106).

Following consideration of the three factors (steps 101-106), the overall score for the default candidate pattern is adjusted (step 107). The complexity (or simplicity) score is determined in accordance with:

$$\text{score} = (6 \times \text{numNgrams}) - (\text{numGroups} + 2) \times \text{numNonDupWords} - \text{numDupWords} \quad (1)$$

where numNgrams is the number of n-grams, numGroups is the number of groups of words, numNonDupWords is the number of non-duplicated words, and numDupWords is the number of duplicated words. However, to limit the overall influence of the score, the following rules are also applied in adjusting the score:

The score is never greater than 10 or less than −10.

In the total score for a candidate, the simplicity score is never greater than 50% of the article score.

Other formulations of scoring are possible. Following structural complexity matching evaluation (steps 101-107), the resulting score is returned (step 108).

Labels Evaluation

Different default candidate patterns could end with the same score. Two cases stand out:

There are many patterns with nearly the same score. Among the completing patterns, one of the patterns has a "bonus" label.

None of the candidates match any articles.

Accordingly, to make a reasonable guess in both of these cases, a bonus score is awarded to the pattern with a bonus label, contributing up to 20% to the total score, although other approaches that assign credit for a bonus label to a suitable minority role in scoring could be used. FIG. 10 is a flow diagram showing a routine 110 for evaluating labels for use with the routine 80 of FIG. 7. Each default candidate pattern is iteratively processed (steps 111-114) and, during each iteration, the pattern is evaluated for a bonus label, which is a pattern including all of the words in the topic label (step 112).

To make a reasonable guess in these cases, the system awards a bonus to the default candidate pattern with a bonus label Bonuses are awarded (step 113) as follows:

Matching single word pattern: 15 points

Conjunction with all bonus words: 15 points n-gram with all bonus words appearing in order: 20 points This scoring recognizes that some labels have only a single word, while other labels have multiple words. Moreover, it-grams are more specific than conjunctions among the patterns that contain the same words as multiple-word labels and the scoring introduces a bias for the most specific label word pattern. For example, for the topic label "Mountain View," this scoring favors the n-gram "{mountain view}" over the conjunction "[mountain view]." The n-gram will not match articles that mention mountains and views. As a further example, the n-gram "{Portola valley}" is favored over the conjunction "[Portola valley]." The latter conjunction matches articles about other towns in the San Francisco Bay Area that use Portola as part of a word phrase or proper noun, such as "Portola School," and which also mention the word valley.

Following structural complexity matching evaluation (steps 111-114), the resulting score is returned (step 115).

Hard Constraint Evaluation

"Hard" constraints represent gatekeepers of valid patterns. FIG. 11 is a flow diagram showing a routine 120 for evaluating hard constraints for use with the routine 80 of FIG. 7. The hard constraints require that:

The pattern cannot be a single term if a topic label is duplicated (step 121) because a duplicated single-word pattern does not have any discriminatory power for selecting articles under a particular topic.

Patterns must include a local topic term (step 123). The words in the label of a topic are likely to be discriminating.

If a topic label is duplicated (step 125), then pattern must include a parent word (step 126). When multiple topics have the same label, the label by itself cannot be used to discriminate among the topics.

If a default candidate pattern violates any of the hard constraint rules, the pattern is penalized (steps 122, 124, 127, respectively), such as through a 100-point penalty to separate the pattern from those patterns that do not violate a hard constraint rule. Following hard constraint evaluation (steps 121-127), the resulting score is returned (step 128).

Soft Constraint Evaluation

Soft constraints indicate weaker preferences than hard constraints. FIG. 12 is a flow diagram showing a routine 130 for evaluating soft constraints for use with the routine 80 of FIG. 7. Soft constraints require that:

A candidate should include at least one, non-duplicated local topic word (step 131). Non-duplicated words have more discriminating power than duplicated words.

Candidates for duplicated topic labels (step 133) should include a non-duplicated, parent word (step 134). Non-duplicated words from a parent have more discriminating power than duplicated words.

Candidates for duplicated topic labels (step 133) should not include words from a common ancestor (step 136). Words from common ancestors of topics with the same label cannot discriminate between the topics.

If a default candidate pattern violates any of the soft candidate rules, the pattern is penalized (steps 132, 135, 137, respectively), such as through a 20-point penalty for every soft constraint violated. Following soft constraint evaluation (steps 131-137), the resulting score is returned (step 138).

EXAMPLES

Figure 13:
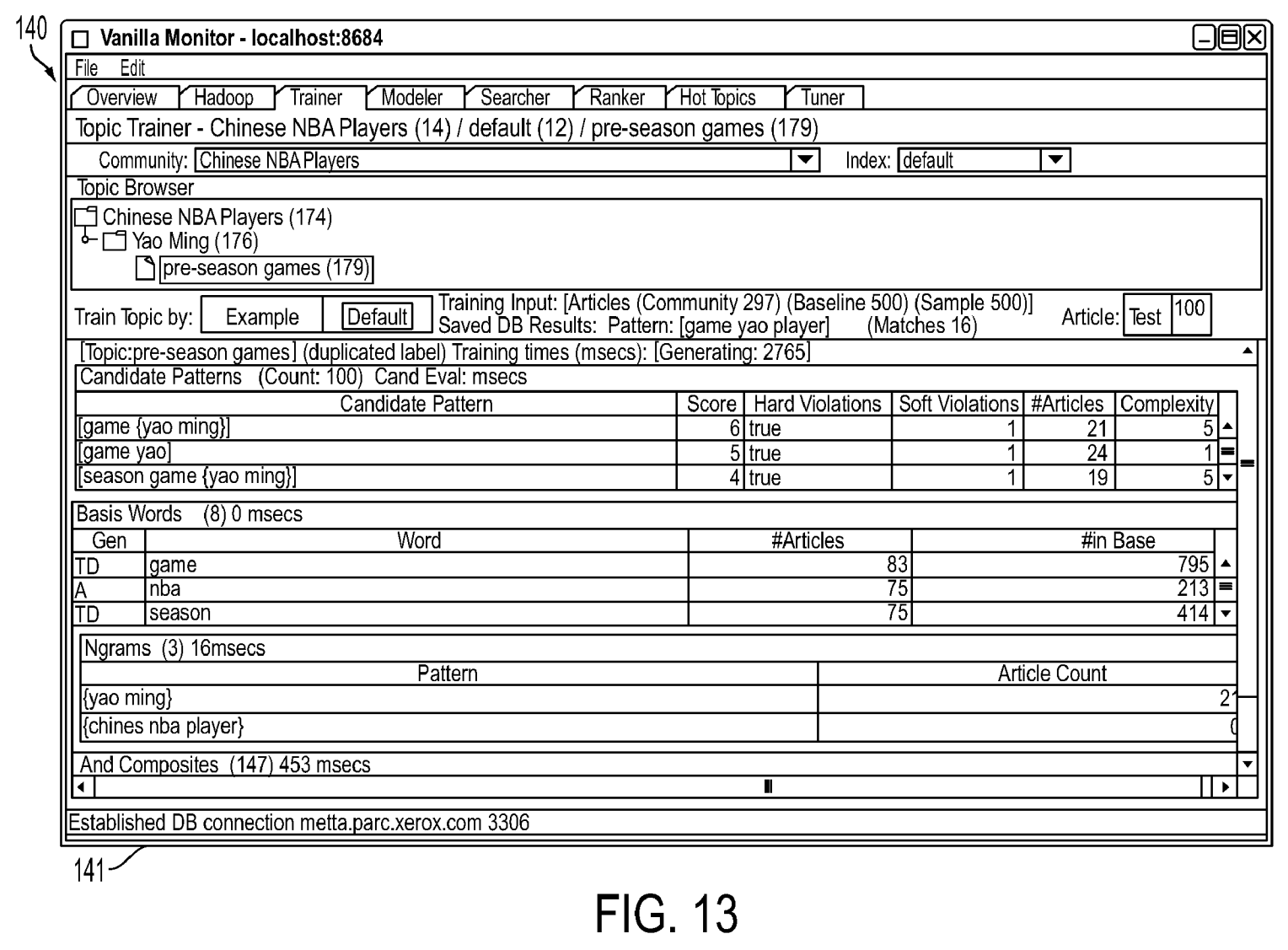
Figure 14:
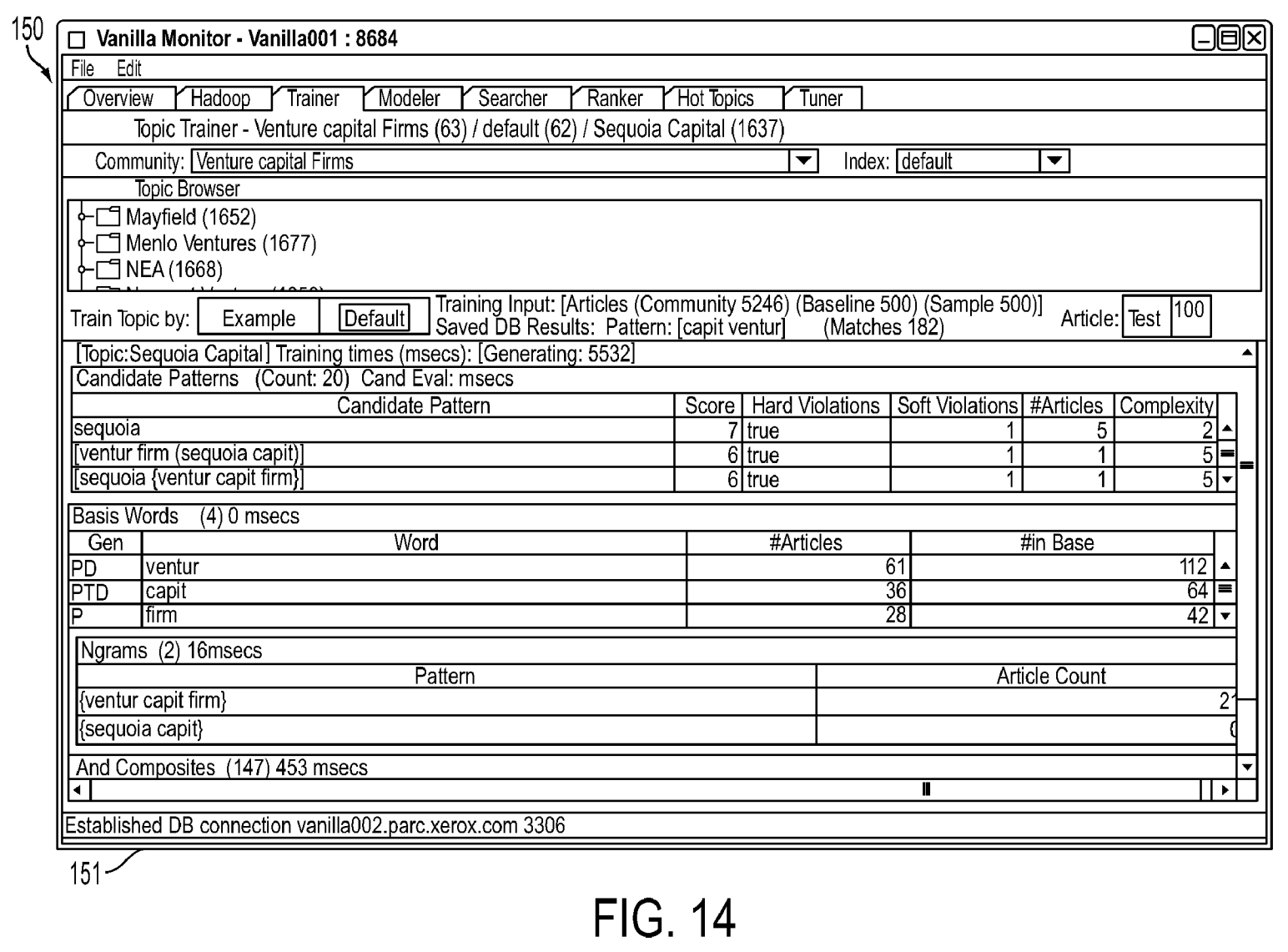

Through the default hierarchical training methodology, a topic model is created for each topic in a given index without requiring a user to provide any training examples. FIGS. 13-14 are screen shot diagrams 140, 150 showing, by way of example, results of default hierarchical training 141, 151 for social indexing. Referring first to FIG. 4, an example of a case with duplicated labels is depicted. The label "pre-season games" is repeated across three basketball players. For pre-season games played by Yao Ming, the preferred pattern chosen through default hierarchical training is "[game {yao ming}]," that is, a conjunction of the term "game" and the n-gram "yao ming." Referring next to FIG. 5, an example of resolving duplicated words in labels is depicted. The topic "Sequoia Capital" has being trained with the single term "Sequoia" being chosen as the preferred pattern. The duplicated word "Capital" is avoided. Much of the trade-off in this example is between the simplicity score and performance on matching articles.

Variations

Social indexes are created for a user without requiring example-based training. A system and method for providing default hierarchical training produces a draft index from chosen information sources and a hierarchy of topics for the index. Consequently, the user gets results quickly.

In the absence of training examples, there is no gold standard for performance. In one embodiment, some constraints are deemed more important than others and the constraints are divided into "hard" and "soft" constraints. The scoring method penalizes violations of the hard constraints the most. However, other approaches are possible, such as simply ruling out default candidate patterns that violate hard constraints, rather than merely penalizing the patterns through their score. Moreover, like in example-based training, the default hierarchical training methodology counts matching articles and considers the complexity of the pattern. Pattern complexity is considered of secondary importance to the violation of constraints and the scoring is based on counts of article matches.

Perhaps the most important and unique elements to default hierarchical training are considerations of relationships to other nodes in the topic tree. These considerations include:

Topical Hierarchy. Consideration of parent and ancestor nodes.

Duplicated Topic Labels. In evaluating patterns, special considerations for cases involving duplicated labels Duplicated Words. In selecting words for inclusion in patterns, special consideration about words that appear in more than one label.

Still other considerations may apply.

In a further embodiment, a machine-learning approach to default hierarchical training could be created by collecting thousands of index topics, together with answers that have been certified as being correct. Applying a modeling approach, the system search could search for the best assignment of weights to different features that meet the majority of the training cases.

In a still further embodiment, complete semantic models of the meanings of the words found in the topic labels could be incorporated into the default pattern trainer, which would facilitate finding an optimal default pattern by helping to determine the user's intent in constructing the topical index.

While the invention has been particularly shown and described as referenced to the embodiments thereof, those skilled in the art will understand that the foregoing and other changes in form and detail may be made therein without departing from the spirit and scope.

What is claimed is:

1. A computer-implemented method for providing default hierarchical training for social indexing, comprising:
   maintaining articles of digital information for social indexing;
   specifying a hierarchically-structured tree of topics, which each comprise a label comprising one or more words;
   identifying hard constraints based on the labels comprised in the topic tree and the topic tree's hierarchical structure, and defining the hard constraints to include immutable rules comprising at least one of:
   requiring that a topic model comprises a single term comprised from a label that is duplicated within the topic tree;
   requiring that a topic model includes no term from the label for the topic to which the topic model belongs; and
   when the label is duplicated within the topic tree, requiring that a topic model includes no term from the label of a parent topic for the topic to which the topic model belongs;
   for each topic in the topic tree, creating a topic model subject to the hard constraints, the topic model comprising a finite state pattern that comprises a pattern evaluable against the articles;
   evaluating the topic models for the topic tree against the hard constraints and disfavoring those topic models that violate one or more of the immutable rules; and
   identifying for each topic, the topic model, which best satisfies the constraints.

2. A method according to claim 1, further comprising:
   defining soft constraints to include permissive rules; and
   discounting those topic models that violate one or more of the permissive rules.

3. A method according to claim 2, wherein the permissive rules comprise one or more of:
   forming one such topic model that includes no term from the label for the topic to which the topic model belongs that is not duplicated in any other label within the topic tree;
   when the label is duplicated in another label within the topic tree, forming one such topic model that includes no non-duplicated term from the label of a parent topic for the topic to which the topic model belongs; and
   when the label is duplicated in another label within the topic tree, forming one such topic model that includes a term from a label of a common ancestor topic for the topic to which the topic model belongs.

4. A method according to claim 1, further comprising:
   counting the articles that are matched by each of the topic models; and
   favoring those topic models proportionately matching a percentage of the articles closest to an ideal percentage.

5. A method according to claim 1, further comprising:
   for each of the topic models, evaluating structural complexity, comprising one or more of:
   favoring those topic models that include at least one n-gram;
   favoring those topic models that include one or more non-duplicated terms; and
   favoring those topic models that include at least one group of the terms in the labels.

6. A method according to claim 1, further comprising:
   identifying the topic models that have been evaluated as equally satisfying the hard constraints; and
   favoring the topic model that includes a bonus label comprising one of a matching single term pattern, conjunction of all of the terms in the label for the topic to which the topic model belongs, and an n-gram of all of the terms in the label for the topic to which the topic model belongs appearing in order.

7. A method according to claim 1, further comprising:
   for each of the topic models, disfavoring those topic models with a count of the terms that is less than a count of the terms in the label for the topic to which the topic model belongs.

8. A method according to claim 1, wherein the at least one term comprises at least one of one of the terms in the labels, an n-gram comprised of a plurality of the terms in the labels, and a group of the terms in the labels.

9. A method according to claim 1, wherein each topic model comprises one of a conjunction and an n-gram, which are both comprised of the same terms as in the label for the topic to which the topic model belongs.

10. A method according to claim 1, further comprising:
    deriving each term from a stemmed version of a word in one such label.

11. A computer-implemented system for providing default hierarchical training for social indexing, comprising:
    an electronic database, comprising:
    articles of digital information maintained for social indexing; and
    a hierarchically-structured tree of topics, which each comprise a label comprising one or more words;
    a processor and memory within which code for execution by the processor is stored, further comprising:
    an electronically-stored rules set identifying hard constraints based on the labels comprised in the topic tree and the topic tree's hierarchical structure, wherein the hard constraints are defined to include required immutable rules comprising at least one of:
    that a topic model comprises a single term comprised from a label that is duplicated within the topic tree;
    that a topic model includes no term from the label for the topic to which the topic model belongs; and
    when the label is duplicated within the topic tree, that a topic model includes no term from the label of a parent topic for the topic to which the topic model belongs;
    a topic builder module that, for each topic in the topic tree, creates a topic model subject to the hard constraints, the topic model comprising a finite state pattern that comprises a pattern evaluable against the articles; and an evaluator module evaluating the topic models for the topic tree against the hard constraints, and disfavoring those topic models that violate one or more of the immutable rules; and a user interface visually identifying for each topic, the topic model, which best satisfies the constraints.

12. A system according to claim 11, wherein the electronically-stored rules set further identify soft constraints are defined to include permissive rules, and those topic models that violate one or more of the permissive rules are discounted.

13. A system according to claim 12, wherein the permissive rules comprise one or more of:

one such topic model that includes no term from the label for the topic to which the topic model belongs that is not duplicated in any other label within the topic tree;

one such topic model that includes no non-duplicated term from the label of a parent topic for the topic to which the topic model belongs when the label is duplicated in another label within the topic tree; and one such topic model that includes a term from a label of a common ancestor topic for the topic to which the topic model belongs when the label is duplicated in another label within the topic tree.

14. A system according to claim 11, wherein the processor and memory further comprise:

an article matching evaluation module counting the articles that are matched by each of the topic models, and favoring those topic models proportionately matching a percentage of the articles closest to an ideal percentage.

15. A system according to claim 11, wherein the processor and memory further comprise:

a structural complexity evaluation module evaluating structural complexity for each of the topic models, comprising one or more of favoring those topic models that include at least one n-gram, favoring those topic models that include one or more non-duplicated terms, and favoring those topic models that include at least one group of the terms in the labels.

16. A system according to claim 11, wherein the processor and memory further comprise:

a label evaluation module identifying the topic models that have been evaluated as equally satisfying the hard constraints, and favoring the topic model that includes a bonus label comprising one of a matching single term pattern, conjunction of all of the terms in the label for the topic to which the topic model belongs, and an n-gram of all of the terms in the label for the topic to which the topic model belongs appearing in order.

17. A system according to claim 11, wherein the processor and memory further comprise:

a term count evaluation module disfavoring, for each of the topic models, those topic models with a count of the terms that is less than a count of the terms in the label for the topic to which the topic model belongs.

18. A system according to claim 11, wherein the at least one term comprises at least one of one of the terms in the labels, an n-gram comprised of a plurality of the terms in the labels, and a group of the terms in the labels.

19. A system according to claim 11, wherein each topic model comprises one of a conjunction and an n-gram, which are both comprised of the same terms as in the label for the topic to which the topic model belongs.

20. A system according to claim 11, wherein the processor and memory further comprise:

a word stemming module deriving each term from a stemmed version of a word in one such label.

\* \* \* \* \*